(12) United States Patent
Billingsley

(10) Patent No.: US 9,986,694 B2
(45) Date of Patent: Jun. 5, 2018

(54) SYSTEMS AND METHODS FOR A VERTICAL PLANTER

(71) Applicant: Alex E. Billingsley, Phoenix, AZ (US)

(72) Inventor: Alex E. Billingsley, Phoenix, AZ (US)

( * ) Notice: Subject to any disclaimer, the term of this patent is extended or adjusted under 35 U.S.C. 154(b) by 0 days. days.

(21) Appl. No.: 13/920,014

(22) Filed: Jun. 17, 2013

(65) Prior Publication Data

US 2013/0333286 A1    Dec. 19, 2013

Related U.S. Application Data

(60) Provisional application No. 61/660,226, filed on Jun. 15, 2012.

(51) Int. Cl.
*A01G 9/02*    (2018.01)

(52) U.S. Cl.
CPC ............. *A01G 9/023* (2013.01); *A01G 9/025* (2013.01); *Y02P 60/244* (2015.11)

(58) Field of Classification Search
CPC .......... A01G 9/02; A01G 9/022; A01G 9/023; A01G 9/024; A01G 9/025; A01G 31/06
USPC ............... 47/39, 66.5, 86, 66.6, 65.5, 83, 82
See application file for complete search history.

(56) References Cited

U.S. PATENT DOCUMENTS

| | | | |
|---|---|---|---|
| 1,907,917 A * | 5/1933 | White ........................ | A01G 5/04 108/16 |
| 3,018,898 A * | 1/1962 | Frazelle ........................ | 211/107 |
| 3,028,136 A * | 4/1962 | Vento ........................ | A47J 45/00 248/291.1 |
| 3,772,827 A * | 11/1973 | Ware ................................. | 47/39 |
| D251,579 S * | 4/1979 | Calgaro ........................ | D6/566 |
| 4,334,387 A | 6/1982 | Karpisek | |
| 4,380,136 A | 4/1983 | Karpisek | |
| 4,658,541 A | 4/1987 | Haile | |
| 4,691,832 A * | 9/1987 | Steiger ........................ | 211/85.23 |
| 4,896,456 A | 1/1990 | Grant | |
| 5,251,399 A * | 10/1993 | Rasmussen ........................ | 47/39 |
| 5,327,676 A * | 7/1994 | Kosky .................... | A47G 7/044 248/312.1 |
| 5,502,922 A * | 4/1996 | Shlomo ........................ | 47/62 R |
| 5,826,375 A | 10/1998 | Black | |
| 6,634,138 B2 * | 10/2003 | Katzman ................. | B05B 17/08 239/12 |

(Continued)

FOREIGN PATENT DOCUMENTS

| FR | 0957705 | * 10/2009 |
|---|---|---|
| JP | H06046944 | * 6/1994 |

OTHER PUBLICATIONS

Koichi Serizawa, Flower Stand, Jun. 1994, JPH06046944 English translation.*

*Primary Examiner* — Peter M Poon
*Assistant Examiner* — Magdalena Topolski
(74) *Attorney, Agent, or Firm* — The Noblitt Group, PLLC

(57) ABSTRACT

Various embodiments provide systems and methods for a vertical planter. Systems and methods according to various aspects of the present invention may comprise a planter system configured for growing plants in horizontal rows wherein each row is arranged vertically with respect to each other row. The planter system may comprise a planter container, a container support, and a vertical support. The vertical support may be coupled to a structure. The container support may be coupled to the vertical support and configured to support the weight and form of the planter container.

27 Claims, 14 Drawing Sheets

(56) References Cited

U.S. PATENT DOCUMENTS

Figure 1A:
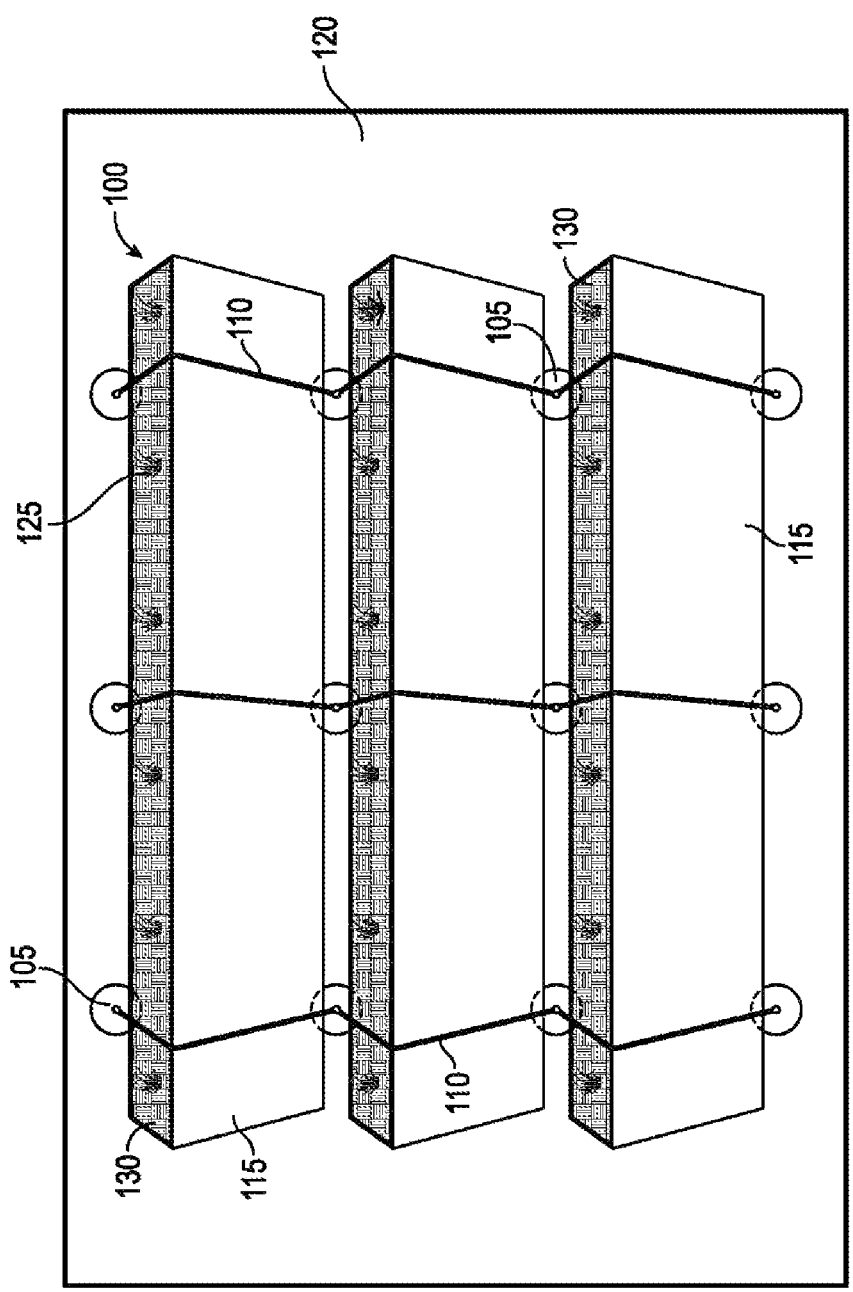

| | | | |
|---|---|---|---|
| 6,725,601 B2 | 4/2004 | Chick | |
| 7,176,024 B2 * | 2/2007 | Branson et al. | 435/420 |
| 8,132,366 B1 * | 3/2012 | LeBlanc | 47/67 |
| 8,141,294 B2 | 3/2012 | Bribach et al. | |
| 2005/0034363 A1 * | 2/2005 | Warren | 47/39 |
| 2006/0231687 A1 * | 10/2006 | Cieri | 248/27.8 |
| 2009/0173004 A1 * | 7/2009 | Weast | 47/83 |
| 2009/0183427 A1 * | 7/2009 | DiMaggio | 47/39 |
| 2009/0223126 A1 | 9/2009 | Garner et al. | |
| 2011/0016784 A1 | 1/2011 | Taber | |
| 2011/0094153 A1 | 4/2011 | Urriola | |
| 2011/0247267 A1 * | 10/2011 | Lutzke | 47/65.7 |
| 2011/0258925 A1 | 10/2011 | Baker | |
| 2011/0258929 A1 | 10/2011 | Mesiara | |
| 2012/0227320 A1 * | 9/2012 | Dos Santos | 47/79 |
| 2012/0285084 A1 * | 11/2012 | Hu | 47/39 |
| 2013/0145690 A1 * | 6/2013 | Cannon | 47/66.7 |
| 2013/0219788 A1 * | 8/2013 | VanLente | 47/62 A |
| 2014/0075840 A1 * | 3/2014 | Gosling et al. | 47/81 |
| 2014/0109473 A1 * | 4/2014 | Sung | 47/39 |
| 2014/0230325 A1 * | 8/2014 | Collis | A01G 9/022 47/82 |
| 2014/0311030 A1 * | 10/2014 | Anderson et al. | 47/62 A |
| 2015/0313104 A1 * | 11/2015 | Cottrell | A01G 1/001 47/62 A |

* cited by examiner

SYSTEMS AND METHODS FOR A VERTICAL PLANTER

CROSS-REFERENCE TO RELATED APPLICATION

This application claims the benefit of U.S. Provisional Application No. 61/660,226, filed Jun. 15, 2012, and incorporates the disclosure of such application in its entirety by reference. To the extent that the present disclosure conflicts with any referenced application, however, the present disclosure is to be given priority.

BACKGROUND

Vertical planters for façade greening provide practical benefits to indoor and outdoor structures, including moderating the temperature of walls, reducing surface decay of a structure from sun exposure, and reducing airborne pollutants in small spaces. Vertical planters may also utilize previously unusable space for growing plants for consumption, such as vegetables and herbs.

Vertical planter systems may present challenges in effective watering and drainage. Some vertical planters may promote the accumulation of moisture between the structure and the planter, causing damage and decay to the structure when the plants are watered. Further, watering a large number of plants in a stacked vertical planter may be time consuming, requiring professional management of large planter units in commercial environments.

Vertical planters may also be difficult and expensive to ship or move from one structure to another due to their substantial weight and size. Large vertical planters may require multiple people to lift the planter and may have vertical support structures that may cause substantial damage to the structure.

BRIEF SUMMARY

Various embodiments provide systems and methods for a vertical planter. Systems and methods according to various aspects of the present invention may comprise a planter system configured for growing plants in horizontal rows wherein each row is arranged vertically with respect to each other row. The planter system may comprise a planter container, a container support, and a vertical support. The vertical support may be coupled to a structure. The container support may be coupled to the vertical support and configured to support the weight and form of the planter container.

BRIEF DESCRIPTION OF THE DRAWING FIGURES

A more complete understanding of the present invention may be derived by referring to the detailed description when considered in connection with the following illustrative figures. In the following figures, like reference numbers refer to similar elements and steps throughout the figures.

Elements and steps in the figures are illustrated for simplicity and clarity and have not necessarily been rendered according to any particular sequence or scale. For example, steps that may be performed concurrently or in different order are illustrated in the figures to help to improve understanding of embodiments of the present invention.

Figure 1B:
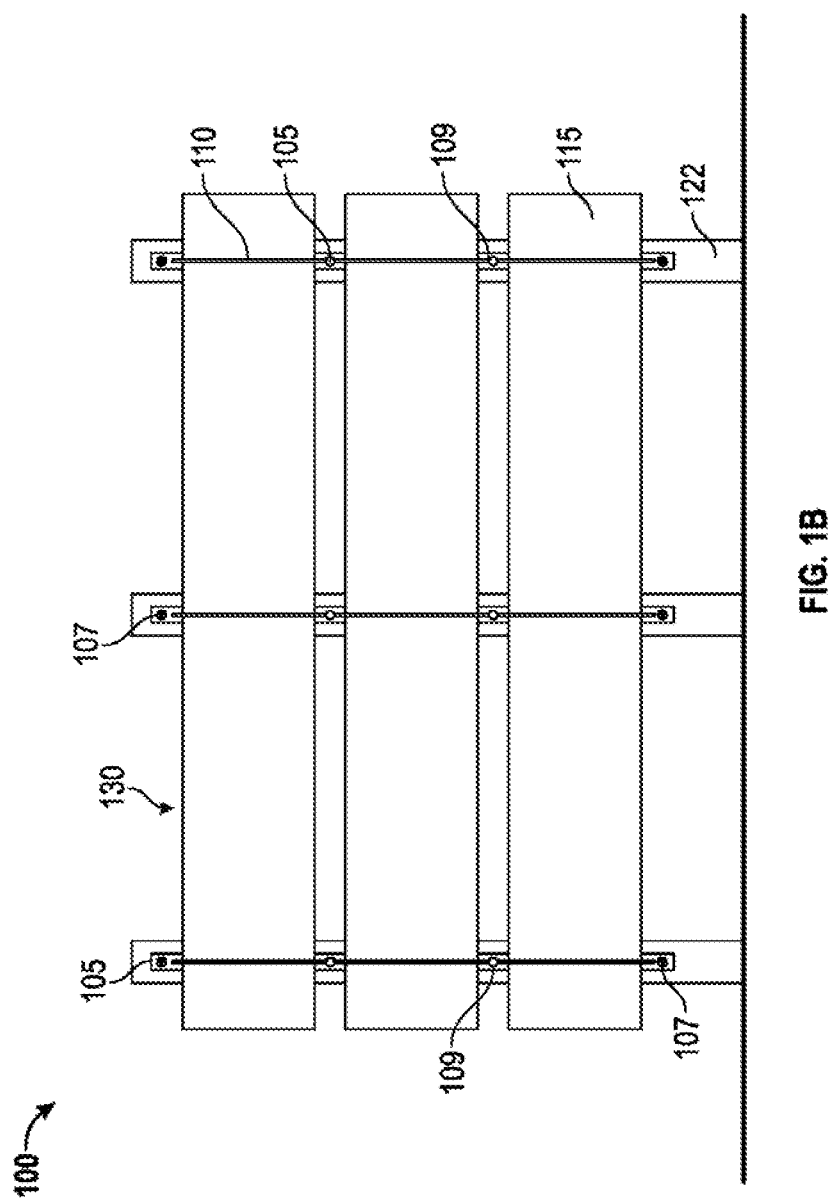
Figure 2A:
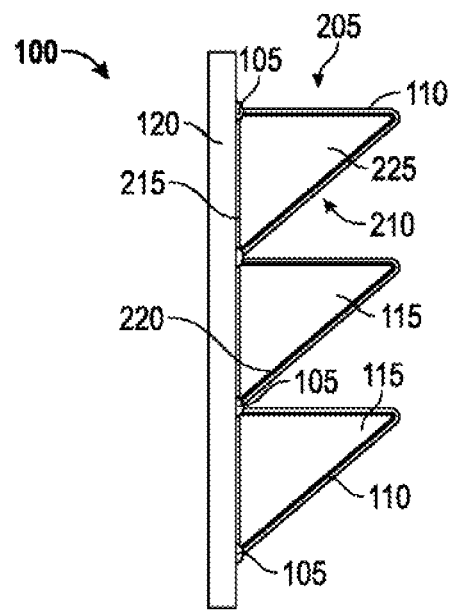
Figure 2B:
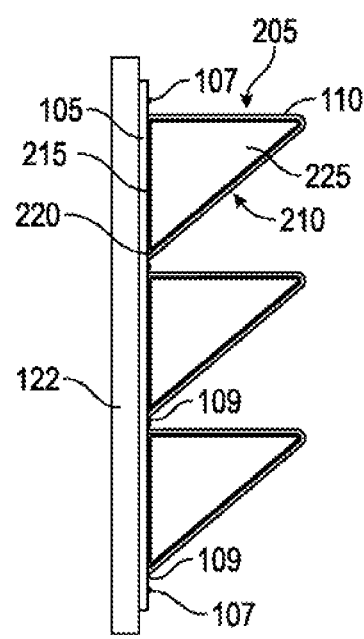
Figure 4A:
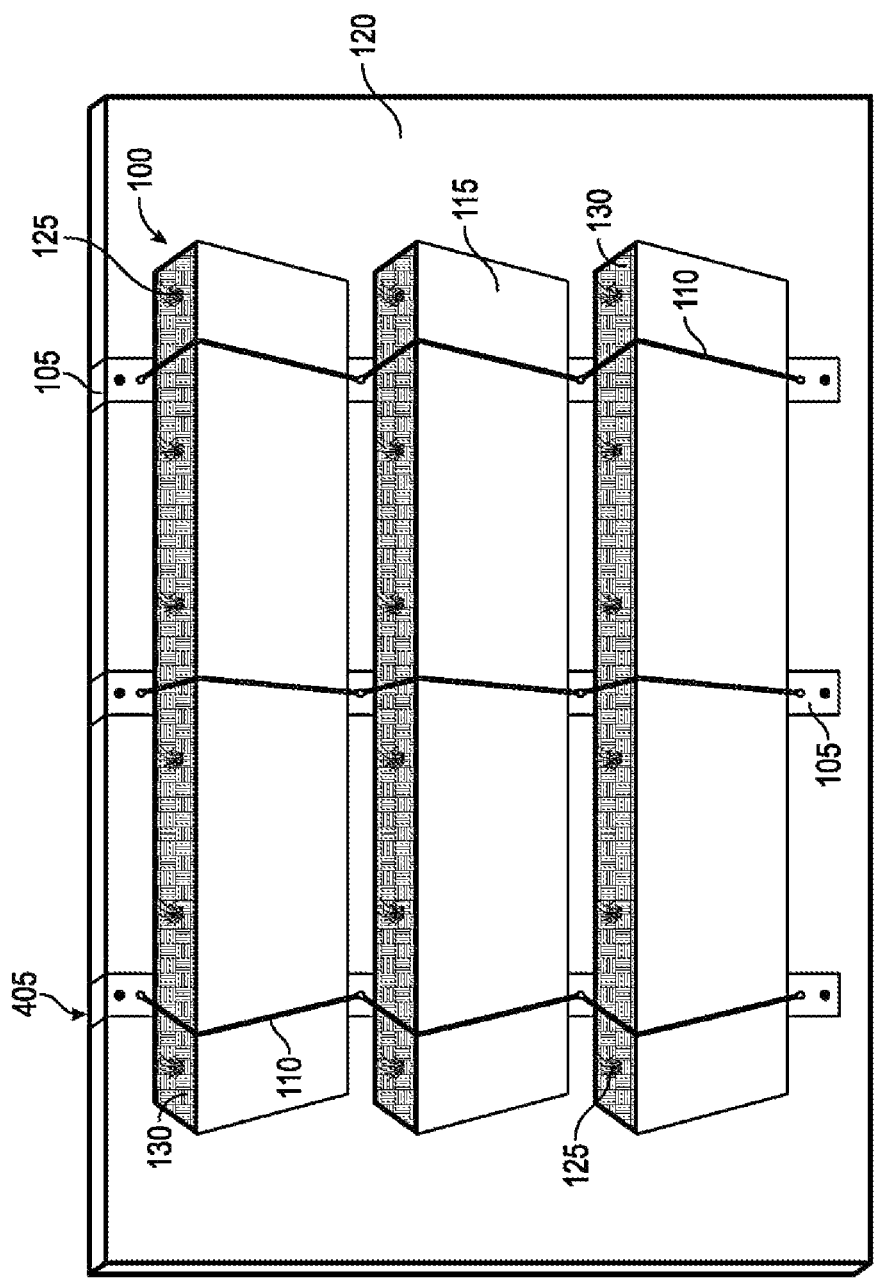
Figure 4B:
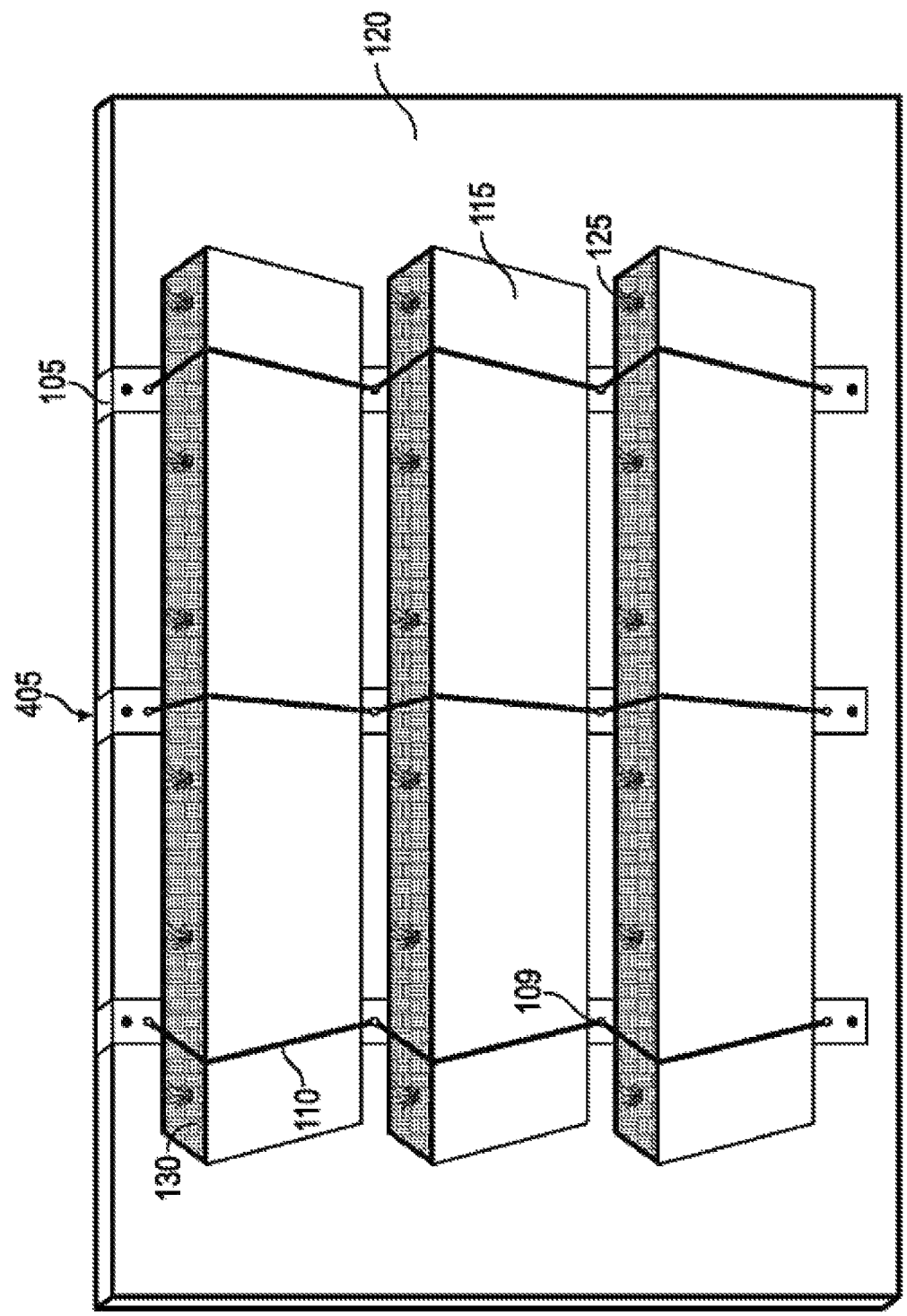
Figure 5:
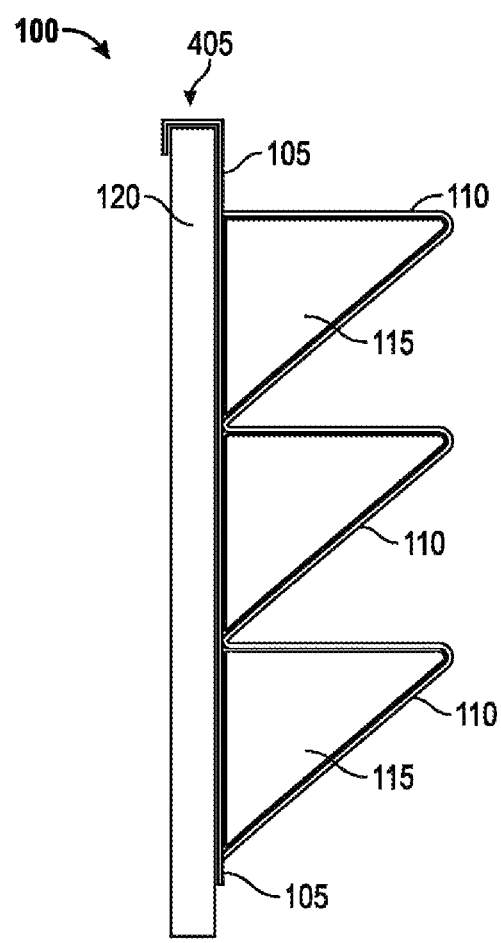
Figure 6A:
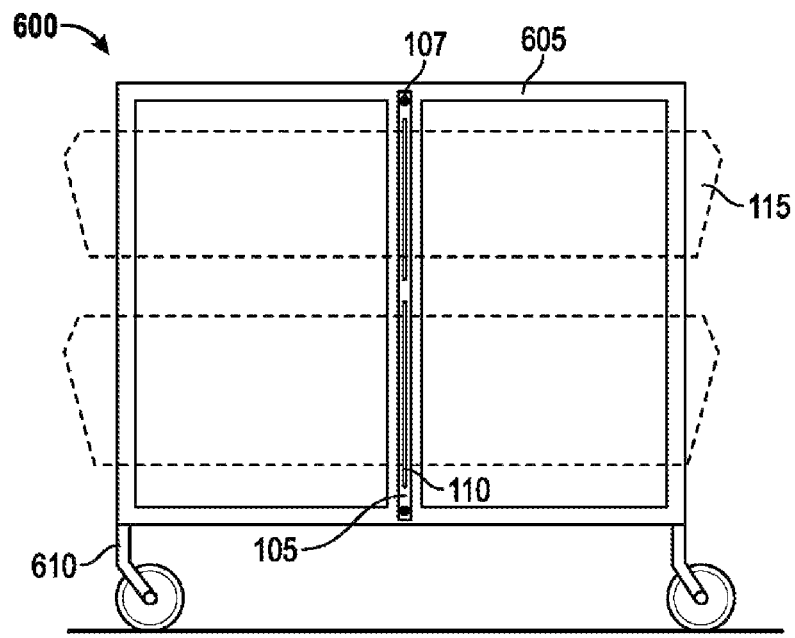
Figure 6B:
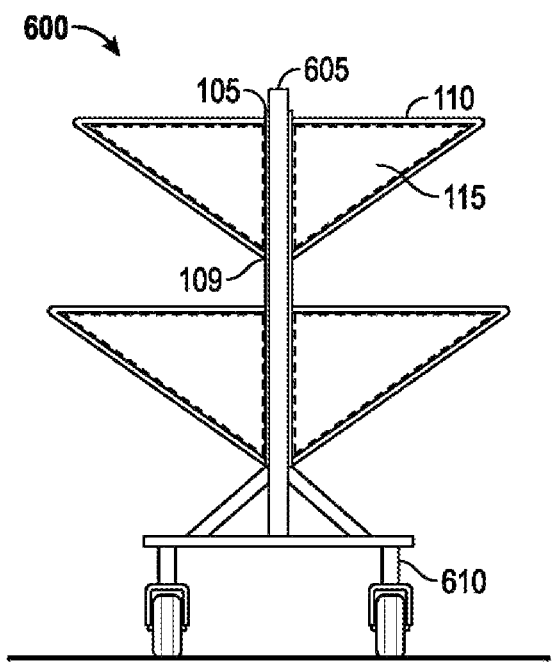
Figure 7:
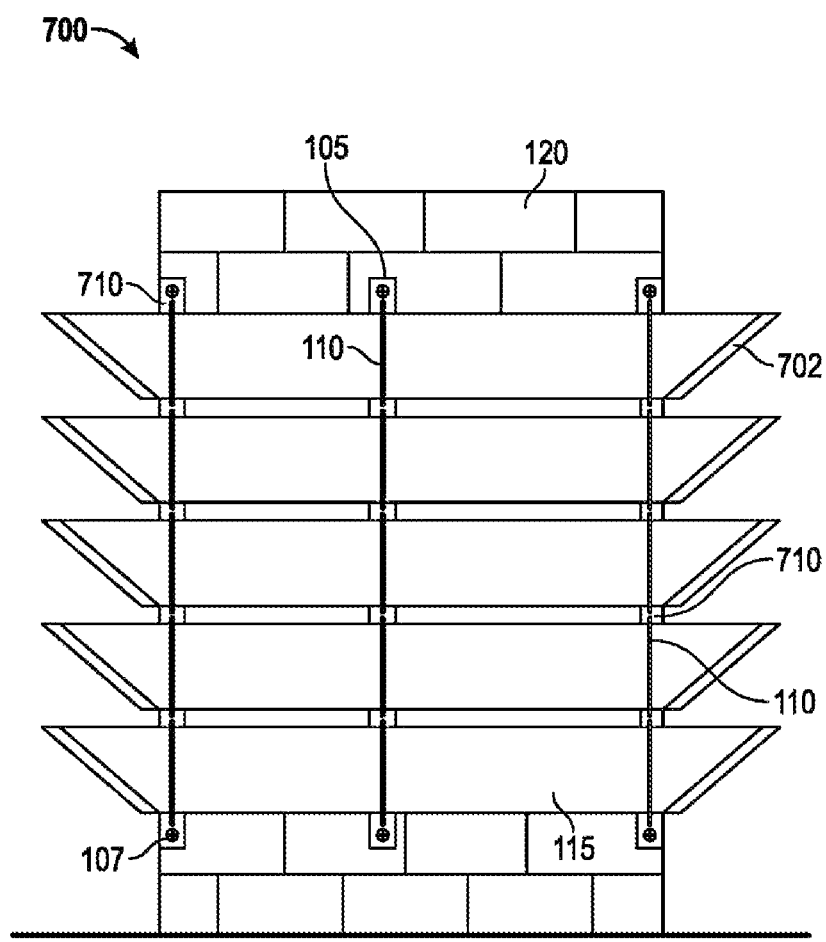
Figure 8:
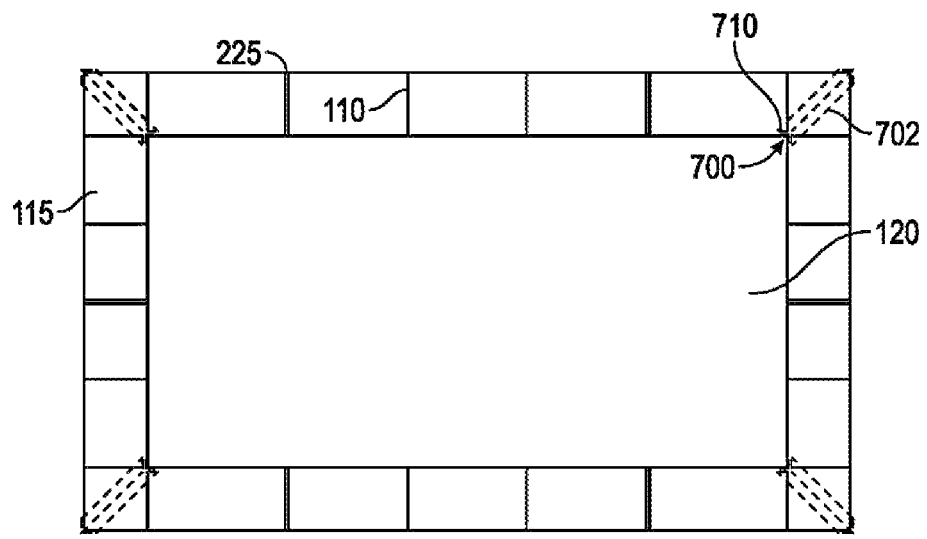
Figure 9:
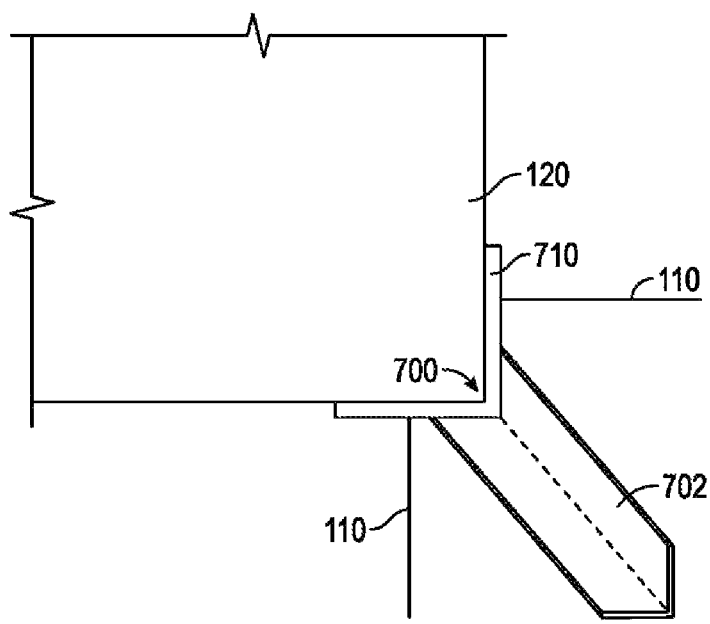
Figure 10:
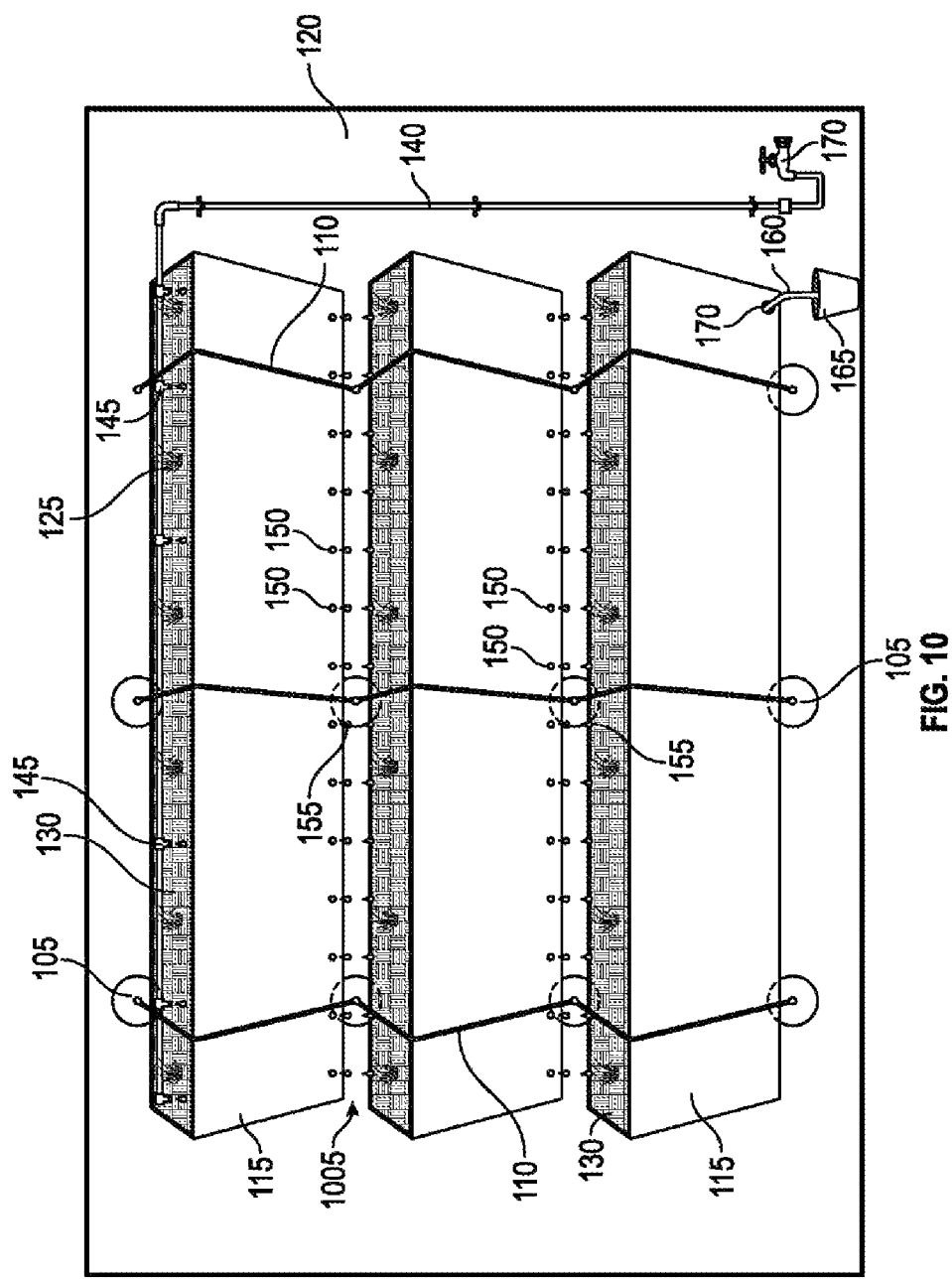
Figure 11:
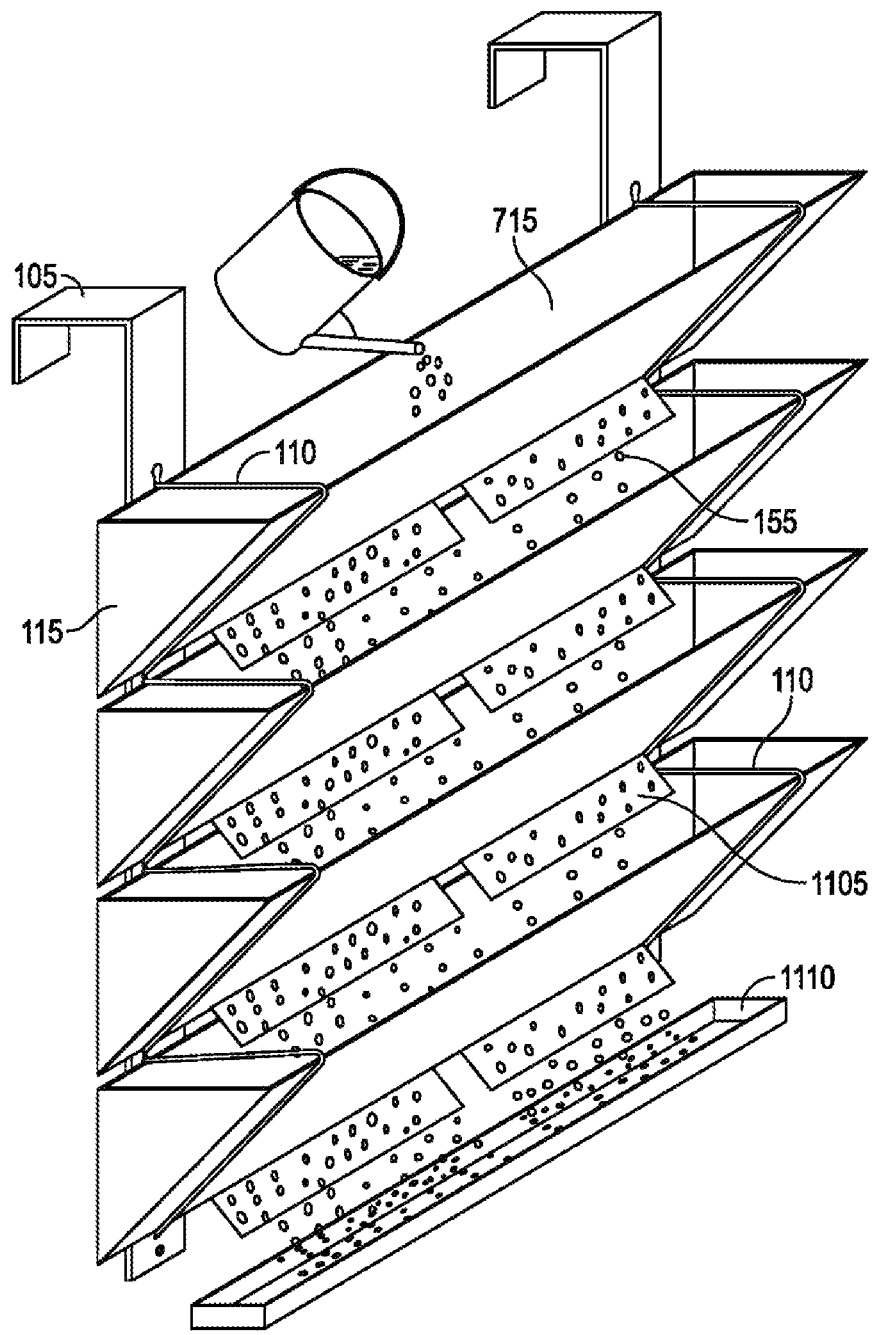
Figure 12:
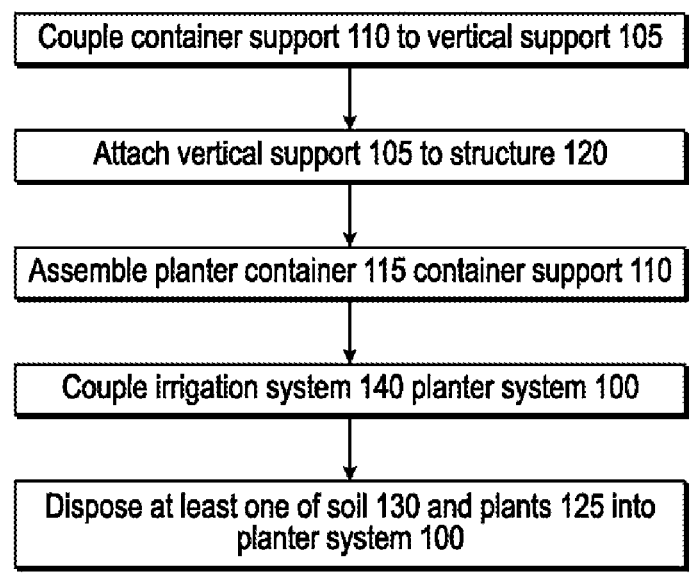

The figures described are for illustration purposes only and are not intended to limit the scope of the present disclosure in any way. Various aspects of the present invention may be more fully understood from the detailed description and the accompanying drawing figures, wherein:

FIGS. 1A-1B representatively illustrate a front view of a planter system mounted directly onto a structure;

FIGS. 2A-2B representatively illustrate a side view of a planter system mounted directly onto the structure;

FIGS. 3A-3E representatively illustrate keyhole connections between components of a planter system;

FIGS. 4A-4B representatively illustrate a front view of a planter system hanging from a structure;

FIG. 5 representatively illustrates a side view of a planter system hanging from a structure;

FIGS. 6A-6B representatively illustrate a mobile planter system;

FIG. 7 representatively illustrates a side view of a planter system with corner connectors mounted continuously around the circumference of a structure;

FIG. 8 representatively illustrates atop view of a planter system with corner connectors mounted continuously around the circumference of a structure;

FIG. 9 representatively illustrates an exemplary corner connector;

FIG. 10 representatively illustrates a planter system comprising a drainage outlet;

FIG. 11 representatively illustrates a planter system comprising a drainage outlet with a water guide; and FIG. 12 representatively illustrates an exemplary method of forming a planter mounted on a structure.

DETAILED DESCRIPTION OF EXEMPLARY EMBODIMENTS

The present invention may be described in terms of functional block components and various processing steps. Such functional blocks may be realized by any number of components configured to perform the specified functions and achieve the various results. For example, the present invention may employ various process steps, apparatus, systems, methods, etc. In addition, the present invention may be practiced in conjunction with any number of systems and methods for mounting planters and providing material for plant growth, and the system described is merely one exemplary application for the invention. Various representative implementations of the present invention may be applied to any type of substantially vertical structure. Certain representative implementations may include, for example, applying the planter system to wall or fence.

The particular implementations shown and described are illustrative of the invention and its best mode and are not intended to otherwise limit the scope of the present invention in any way. For the sake of brevity, conventional manufacturing, connection, preparation, and other functional aspects of the system may not be described in detail. Furthermore, the connecting lines shown in the various figures are intended to represent exemplary functional relationships and/or steps between the various elements. Many alternative or additional functional relationships or physical connections may be present in a practical system.

Various embodiments of the invention provide methods, apparatus, and systems for assembling and mounting the planter system. A detailed description of various embodiments is provided as a specific enabling disclosure that may be generalized to any application of the disclosed systems and methods in accordance with the various described embodiments.

Various representative implementations of the present invention may be applied to any system for growing plants. Certain representative implementations may include, for example, providing any suitable system or method for mounting a planter container to a structure such as a wall, fence, balcony, column, and/or mobile wall. In one embodiment, the planter system may comprise a container support that may be molded to the shape of the planter container. The planter system may also comprise a mounting fastener, such as a vertical support configured to couple the container support to the structure. In one embodiment, the planter system may comprise a modular system configured to be assembled at the site of the structure in any desired number repeating units of the planter container.

In another embodiment, the planter system may comprise any additional components such as an irrigation system, a drainage system, a water guide, and/or a cover. In various embodiments, the cover may comprise a greenhouse material, a lighting system, animal netting, and/or a material for protecting plants in the planter container from wind, rain, and or extreme temperatures.

In various embodiments, the planter system may comprise one planter container or may comprise more than one planter container arranged vertically and/or horizontally as repeating units with respect to the other planter container(s) for vertical gardening and/or façade greening. For example, as shown in FIGS. 1A-1B, the planter system may comprise 3 planter containers in a vertical orientation. This planter container arrangement may be installed on a small structure, such as an interior wall. In another embodiment, multiple planter containers may be horizontally and/or vertically repeated to form a continuous line of planter containers and achieve a desired length. For example, as shown in FIG. 8, this arrangement may cover a larger structure such as an exterior wall or column in a continuous line of planter containers and may be configured to wrap around corners of the structure.

Referring again to FIGS. 1A-1B, systems and methods for the planter system according to various aspects of the present invention may be representatively illustrated by a planter system 100. In one embodiment, the planter system 100 may comprise a vertical support 105, a planter container 115, and a container support 110. In one embodiment, the vertical support 105 may be coupled to a structure 120 such as a wall, fence, balcony, or column. The container support 110 may be coupled to the vertical support 105 and bear the weight of the planter container 115.

In one embodiment, the planter container 115 may comprise any suitable material for holding at least one of soil 130, a plant 125, water, and/or a liner and adapted to hold their weight. For example, the planter container 115 may comprise sturdy and/or rugged materials, such as wood and/or metal, that may support the weight of the soil 130 and the plant 125. In another embodiment, the planter container 115 may comprise one or more materials selected to minimize heat conduction to plant roots in the soil 130, such as where the planter system 100 may be placed in a location receiving full sunlight exposure. For example, the planter container 115 may comprise an insulated backing such as foam in addition to the wood and/or metal (not shown).

In one embodiment, the planter container 115 may comprise repeating stacks of lumber of any size. For example, the lumber may be multiple 1"×4" wood planks arranged adjacent to one another. However, in some embodiments, the planter container 115 may comprise ceramic, silicone, plastic, composites, resin, fiberglass, woven fiber, and/or a combination thereof. In another embodiment, the planter container 115 may comprise any suitable container for holding plants grown in hydroponic mineral nutrient solutions without the soil 130.

In another embodiment, a liner (not shown) may be placed in the planter container 115, for example to provide a water tight seal for the soil 130 and the plant 125. The liner ma at least one of promote the retention of water and reduce the leakage of water and soil 130 onto the surface or ground below the planter system 100. In one embodiment, a drainage system, such as holes and/or the water guide, may be implemented into the liner to direct the flow of moisture through the planter system 100. The liner may comprise any suitable material for lining the inside surface of the planter container 115 and providing a watertight seal. For example, the liner may comprise a coconut fiber liner, plastic liner, fiberglass liner, polyvinyl chloride (PVC) liner, and/or a combination thereof.

The planter container 115 may be any suitable shape and/or have any suitable dimensions to achieve any desired height, length, or volume, provide a desired aesthetic design such as wrapping around a corner of the structure 120 (as shown in FIGS. 7 and 8 as described below), partitioning an open space into smaller delineated spaces, and/or provide privacy. In one embodiment, the dimensions of the planter container 115 may be configured for coupling to a small wall. For example, each planter container 115 may be two feet long. In another embodiment, the dimensions of the planter container 115 may be configured for coupling to a large wall. For example, each planter container 115 may be twenty feet long.

In some embodiments, as shown in FIG. 8, the planter container 115 may be provided in any length and mounted horizontally in adjacent repeated units as a modular structure to achieve any desired length. Further, the planter container 115 may be configured to be any desired depth. The depth of the planter container 115 may be selected based on the species of the desired plant 125. For example, the depth of the planter container 115 may be selected to accommodate the expected depth of the root system and/or the size of the plant 125.

In various embodiments of the present invention, the planter container 115 may comprise any suitable cross-section shape. In one embodiment, the planter container 115 may comprise a triangle shape wherein a front portion may be angled. The angled front portion may at least one of reduce the volume needed of soil 130, shade a lower positioned planter container 115, and provide a surface that receives reduced exposure to direct sunlight. In another embodiment, the planter container 115 may have a square or rectangle cross-section shape to provide a flat interior space for receiving plants 125 and soil 130 in a secondary container, such as a pot or vase.

Referring to FIGS. 2A-B, in an exemplary embodiment according to various aspects of the present invention, the planter container 115 may comprise an inverted triangle or wedge shape cross-section when viewed from the side. The inverse triangular cross-section may be formed by a front portion 210 and a back portion 215 joining at a bottom portion 220 forming an apex and an open top portion 205, wherein sidewall elements 225 are disposed at the ends of the front portion 210 and the back portion 215 to define an interior volume of the planter container 115. For example, the top portion 205 (open for receiving the soil 130 and the plant 125) may be substantially perpendicular with respect to the structure 120 such that the top portion 205 extends outwardly from the structure 120. The front portion 210 may extend at an angle out from the structure 120. In this configuration, pressure from the weight of the planter container 115, the soil 130, and the plant 125, may be directed downward and toward the structure 120. In one embodiment, this configuration may also provide access to a lower planter container 115.

The sidewall element 225 may be coupled to the front portion 210 and/or the back portion 215 of the planter container 115 in any suitable manner. In one embodiment, the sidewall element 225 may be tension set by wedging between the front portion 210 and the back portion 215 of the planter container 115. In another embodiment, the sidewall element 225 may be coupled to the front portion 210 and the back portion 215 of the planter container 115 with a fastener such as staples or nails.

Referring to FIGS. 1A-1B and FIGS. 2A-2B, the planter container 115 may slide through a container support 110 for easy assembly, moving, cleaning, and harvesting of plants. The container support 110 may comprise any suitable material that may secure the planter container 115 to the vertical support 105. For example, the container support 110 may comprise metal, wood, plastic such as snap and play plastic, wire or fiber cable, and/or a combination thereof.

In one embodiment, the container support 110 may comprise a metal bar that may be molded to conform to the shape of the planter container 115. Referring to FIGS. 1A, 2A, 4A, and 5, in some embodiments, the container support 110 may be bent into a "Z" shape to conform to the inverted triangle wedge shape of the planter container 115. For example, the container support 110 may comprise a quarter inch diameter round steel rod that may extend from the top of the highest planter container 115 to the bottom of the lowest planter container 115 forming multiple "Z" shapes along the length of the rod. In one embodiment, the container support 110 may extend from the vertical support 105, across the outside edge of the top portion 205 and around the front portion 210 of the planter container 115 and back to the vertical support 105 positioned below the planter container 115. In another embodiment, the container support 110 may bore through the back portion 215 and the front portion 210 and extend around the outside edge of the front portion 210 and back to the vertical support 105 positioned below the planter container 115 (not shown).

Referring to FIGS. 1B, 2B, and 4B, in another embodiment, the container support 110 may comprise a metal bar bent into a modified "V" to conform to the inverted triangle wedge shape of each individual planter container 115. In this separated configuration, the container support 110 may extend from the top of each planter to the bottom of the same planter, with a separate container support 110 holding each adjacent, upper, and/or lower planter container 115.

In some embodiments, the planter system 100 may comprise more than one container support 110 to support the weight of the planter container 115. For example, the planter system 100 may comprise planter supports 110 placed toward each end of the planter container 115 and one container support 110 placed at approximately the middle of the planter container 115. However, as few or as many container supports 110 may be used as needed to support the weight of the planter container 115. In a further embodiment, the planter container 115 may be configured to be coupled to the container support 110 with screws and/or wire ties (not shown).

In one embodiment, the container support 110 may be coupled to a vertical support 105 at the top and/or bottom of each planter container 115 regardless of whether the container support 110 is used as a continuous "Z" or a separated "V" configuration as described above. The vertical support 105 may comprise any suitable fastener for mounting the container support 110 to the structure 120. For example, referring to FIG. 3A, the vertical support 105 may comprise a concrete anchor. The concrete anchor may be located at every point that the container support 110 contacts the structure 120, in one embodiment, the vertical support 105 may be located at the top of the highest planter container 115, between each planter container 115, and at the bottom of the lowest planter container 115.

Figure 3A:
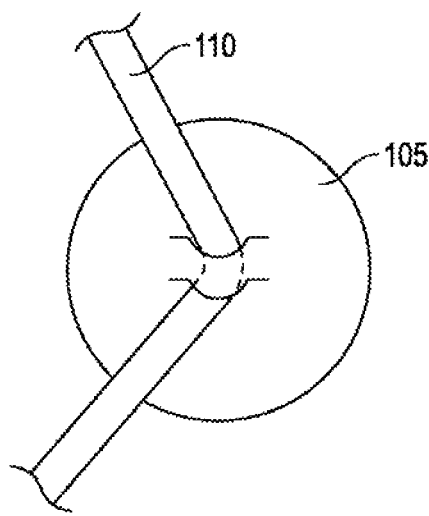
Figure 3B:
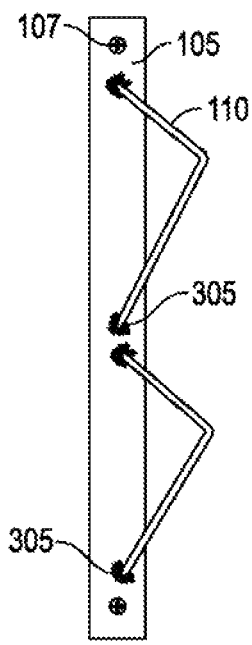

In another embodiment, referring to FIG. 3B, the vertical support 105 may be any suitable bar such as a substantially flat metal bar. The metal bar may be coupled to the structure 120 (not shown) with any suitable fastener, such as concrete screws 107. The metal bar may extend from the top of the highest planter container 115 in the planter system 100 to below the lowest planter container 115. The metal bar may be one continuous bar extending for the full height of the planter system 100 or there may be a plurality of metal bars set end to end to achieve the desired height of the planter system 100.

The container support 110 may be coupled to the vertical support 105 by any suitable method, such as with a fastener. For example, referring to FIG. 3A, the container support 110 may be coupled to the vertical support 105 by sliding into a slot in the vertical support 105. In another embodiment, referring to FIG. 3B, the container support 110 may be coupled to the vertical support 105 with a weld 305.

Figure 3E:
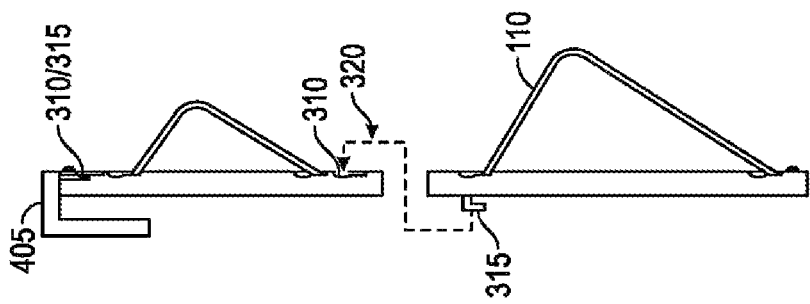
Figure 3D:
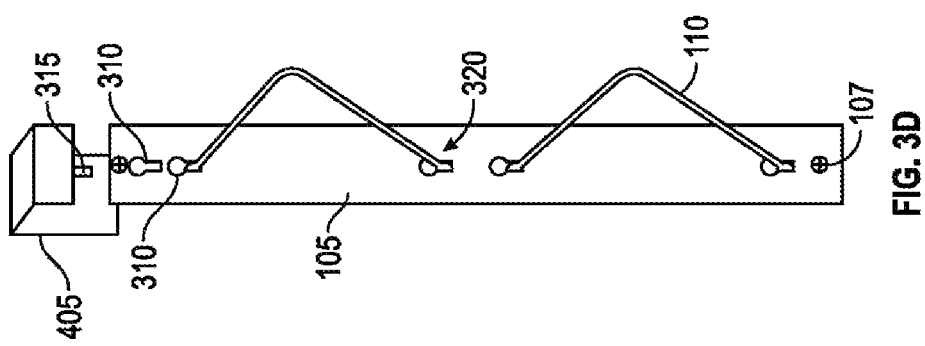
Figure 3C:
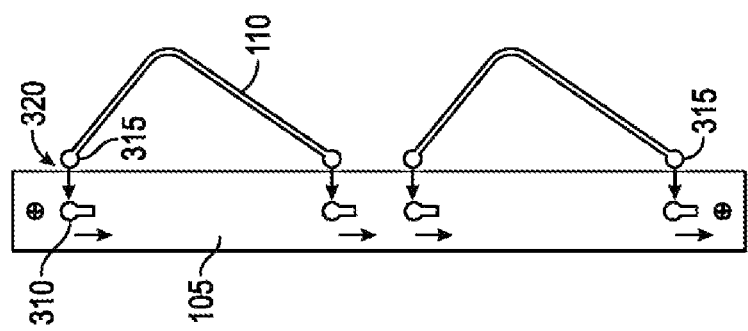

Referring to FIGS. 3C-3E, in various embodiments of the present invention, one or more of the container support 110, the vertical support 105, and/or a U-shaped end 405 may be coupled together with a keyhole system comprising a keyhole 310 and keyhole fitting 315. The keyhole system 320 may allow for the expansion or reduction in the number of planter containers 115 needed, such as when a user moves to a new home and wishes to install the planter system 100 onto a new wall having a difference size than the previous home. In one embodiment, the keyhole system 320 may be implemented for coupling the container support 110 to the vertical support 105. In a further embodiment, the keyhole system 320 may be implemented for coupling the container support 110 and the U-shaped end 405 to the vertical support 105. In yet a further embodiment, the keyhole system 320 may be implemented for coupling the container support 110 and the U-shaped end 405 to the vertical support 105 as well as one or more vertical supports 105 to another vertical support 105. However, the keyhole system 320 may be implemented to couple any combination of container support 110, vertical support 105, and/or U-shaped end 405 together.

Referring to FIGS. 4A-4B and 5, the vertical support 105 may comprise a bar with a square and/or U-shaped end 405 for hanging over the structure 120, such as a property boundary wall or fence. The U-shaped end 405 may be any suitable size, shape, and/or width to accommodate the structure 120 over which it will hang. For example, the U-shaped end 405 for hanging over a cinder block wall may be wide enough to fit over the wall and flat, whereas the U-shaped end 405 for hanging over a railing may be small and round (not shown).

The hanging vertical support 105 may extend toward the ground for a length that accommodates a desired number of planter containers 115. In one embodiment, the planter container 115 may be in front of the vertical support 105 (i.e., the vertical support 105 may be between the planter container 115 and the structure 120). In another embodiment, as shown in FIG. 11, the vertical support 105 may be integral to the planter container 115 and disposed along the interior surface of the back portion 715 of the planter container 115 (i.e., the back portion 715 of the planter container 115 may be between the vertical support 105 and the structure 120).

Referring to FIGS. 6A and 6B, the planter system 100 may be configured as a mobile planter sys 600. In one embodiment, the mobile planter system 600 may be used as a temporary room divider, a façade to hide a structure, and/or may be easily transported to another location such as for an event or for maintenance. The planter system 600 may comprise the planter system 100 as described above, wherein the structure 120 may comprise a frame 605 that may be coupled to a wheeled cart 610.

Referring to FIGS. 7 and 8, the planter system 100 may be mounted at least partially around the circumference of the structure 120, such as a building or column, to form a planter system 100 that appears to wrap continuously around a corner 700 of the structure 120. The planter system 100 may be mounted onto flat surfaces 705 of the structure 120 as described above. The planter system 100 may further be mounted onto the corners of the structure 120 using any suitable corner support system, such as a corner assembly 702.

Referring to FIGS. 8 and 9, the corner assembly 702 may provide a seamless transition of the planter system 100 between two adjacent flat surfaces 705 of the structure 120. In one embodiment, the corner assembly 702 may comprise an angled vertical support 710 that may be coupled to the 90° angle corners 700 of the structure 120. For example, the angled vertical support 710 may be a length of metal with a 90° angle corner detail for fitting onto the corner 700 of the structure 120. The corner assembly 702 may further comprise a corner support 702 coupled to the angled vertical support 710. The corner support 702 may comprise an angled piece of wood or metal that may fit on the inside and/or outside edge of two adjacent planter containers 115 to hold and/or seal the edges together. In one embodiment, the planter containers 115 placed in the corner support 702 may be configured with any angled and/or beveled edge to provide a flush corner, such as a compound miter joint.

Referring now to FIG. 10, in one embodiment, the planter system 100 may additionally comprise an irrigation system 140. For example, the irrigation system 140 may comprise a pipe and/or drip line that may be configured to receive water from a water source such as a hose bib 170. Water may flow through the irrigation system 140 to an outlet 145 where the water enters the planter container 115. In one embodiment, the irrigation system 140 may comprise an automatic timing system for convenient irrigation. In one embodiment, the irrigation system 140 may deliver water and/or a nutrient solution to each planter container 115. In another embodiment, wherein the planter container 115 comprises a drainage system 1005, the irrigation system 140 may deliver water and/or the nutrient solution to just the top planter container 115.

The drainage system 1005 may comprise any suitable drainage components such as drainage holes, water guides, hoses, absorbent material, and/or water receptacles to allow water 155 to drain from the liner, if any, and the bottom of the planter container 115. The water 155 may drain into a lower positioned planter container 115 and/or drain into a water holding container 165. Referring again to FIG. 10, the top and middle planter containers 115 may comprise a plurality of drainage holes 150 and/or a drainage slit (not shown wherein the water 155 delivered to the top planter container 115 may drain to lower planter containers 115, such as the middle and bottom planter containers 115.

In one embodiment, the bottom planter container 115 may comprise a single drainage hole 170 that may empty into the water holding container 165 through a pipe 160. In one embodiment, the bottom planter container 115 may be tipped slightly toward its drainage hole 170 to prevent the accumulation of water 155 at the bottom of the planter container 115. In another embodiment, the bottom planter container 115 may comprise a plurality of drainage holes that may empty into a drainage gutter (not shown) which may flow into the water holding container 165. The water 155 in the water holding container 165 may be reused to provide water 155 to the top planter container 115. In another embodiment, each of the planter containers 115 may comprise a single drainage hole 150 at one end and may be tipped such that the level of the drainage hole 150 is tower than the other end of the planter container 115. In embodiments comprising a liner, the liner may comprise perforations or drainage holes to facilitate the drainage of water 155 according to the design of the planter container 115 that the liner is placed in.

Referring to FIG. 11, in another embodiment, the drainage system 1005 may comprise a moisture receptacle 1110 inserted into the bottom of the planter container 115 allowing water 155 to drain from the top planter container 115 to another planter container 115 located below it. Further, the drainage system 1005 may comprise a water guide 1105. The water guide 1105 may be disposed in or near the drainage holes 150 or drainage slit (not shown) to direct moisture from the bottom of the planter container 115 and into the next lower positioned planter container 115. The water guide 1105 may be configured to promote an even distribution of moisture into the next lower positioned planter container 115 and/or reduce moisture accumulation onto the structure 120.

In one embodiment according to various aspects of the present invention, the planter system 100 may comprise a cover (not shown). In various embodiments, the cover may comprise a solar screen (sunscreen) such as woven vinyl-coated polyester and/or woven fiberglass. The solar screen may shade the plants 125 from direct sunlight. In another embodiment, the cover may comprise a greenhouse fabric for diffusing light and moderating temperatures. For example, the greenhouse fabric may maintain warmth and/or humidity for the plants 125 grown in cold and/or windy climates. The greenhouse fabric may comprise any suitable material such as twin-walled polycarbonate, single-walled polycarbonate, and/or polyfilm plastic.

In another embodiment, the cover may comprise a lighting system for growing the plants 125 indoors or on parts of the structure 120 that may be shaded or dark. The lighting system may comprise any suitable lights, such as light emitting diodes and/or halogen lighting. In yet another embodiment, the cover may comprise animal netting to prevent birds and other wildlife from eating or damaging the plants 125.

In one embodiment, the cover may enclose the planter containers 115. In another embodiment, the cover may be coupled to an attachment mechanism, such as a hook, that may be coupled to the vertical support 105 above the top planter container 115. The cover may be coupled to the attachment mechanism and extend down past the bottom planter container 115. In one embodiment, the attachment mechanism may extend beyond the outer edge of the planter containers 115, such as by approximately one foot.

Various embodiments of the present invention may comprise methods for forming a planter on a mounted structure. In one embodiment, the container support 110 may be coupled to the vertical support 105, wherein the container support 110 is configured to bear the weight of a planter container 115. In one embodiment, the vertical support 110 may be attached to the structure 120. In some embodiments, the planter container 115 may be assembled into the container support 110, such as by sliding through the container support 110. In a further embodiment, methods for forming a planter on a mounted structure may comprise coupling an irrigation system 140 to the planter system 100. In an even further embodiment, methods for forming a planter on a mounted structure may comprise disposing at least one of soil 130 and plants 125 into the planter system 100.

In the foregoing description, the invention has been described with reference to specific exemplary embodiments. Various modifications and changes may be made, however, without departing from the scope of the present invention as set forth. The description and figures are to be regarded in an illustrative manner, rather than a restrictive one and all such modifications are intended to be included within the scope of the present invention. Accordingly, the scope of the invention should be determined by the generic embodiments described and their legal equivalents rather than by merely the specific examples described above. For example, the steps recited in any method or process embodiment may be executed in any appropriate order and are not limited to the explicit order presented in the specific examples. Additionally, the components and/or elements recited in any system embodiment may be combined in a variety of permutations to produce substantially the same result as the present invention and are accordingly not limited to the specific configuration recited in the specific examples.

Benefits, other advantages and solutions to problems have been described above with regard to particular embodiments. Any benefit, advantage, solution to problems or any element that may cause any particular benefit, advantage or solution to occur or to become more pronounced, however, is not to be construed as a critical, required or essential feature or component.

The terms "comprises", "comprising", or any variation thereof, are intended to reference a non-exclusive inclusion, such that a process, method, article, composition, system, or apparatus that comprises a list of elements does not include only those elements recited, but may also include other elements not expressly listed or inherent to such process, method, article, composition, system, or apparatus. Other combinations and/or modifications of the above-described structures, arrangements, applications, proportions, elements, materials or components used in the practice of the present invention, in addition to those not specifically recited, may be varied or otherwise particularly adapted to specific environments, manufacturing specifications, design parameters or other operating requirements without departing from the general principles of the same.

The present invention has been described above with reference to an exemplary embodiment. However, changes and modifications may be made to the exemplary embodiment without departing from the scope of the present invention. These and other changes or modifications are intended to be included within the scope of the present invention.

What is claimed is:

1. A planter system for mounting on a structure, comprising:
    a vertical support configured to be connected to the structure, wherein the vertical support comprises:
        a first attachment point; and
        a second attachment point positioned below the first attachment point;
    a planter container, comprising:
        a vertical back portion having an upper edge positioned proximate to the first attachment point and a lower edge positioned proximate the second attachment point;
        a front portion extending upwardly away from the lower edge of the vertical back portion, wherein:
            a bottom portion of the front portion is positioned proximate the second attachment point; and
            a top portion of the front portion is positioned away from the vertical back portion at a height substantially equal to the upper edge of the vertical back portion; and
        a pair of sidewall elements disposed at each end of the front portion and the vertical back portion, wherein the pair of sidewall elements, the front portion, and the back portion define an interior volume of the planter container having a triangular cross-section;
    a container support affixed to the first and second attachment points, wherein the container support:
        extends perpendicularly outward from the first attachment point, above and across an open top portion of the container, to the top portion of the front portion; and
        extends downwardly along the front portion to the second attachment point.

2. The system of claim 1, wherein the container support is affixed to the back portion of the planter container.

3. The system of claim 1, further comprising a drainage system coupled to the planter container.

4. The system of claim 3, wherein the drainage system comprises at least one drainage hole in the bottom portion of the planter container that is configured to allow moisture to exit the planter container.

5. The system of claim 4, wherein the drainage system further comprises a water guide for directing moisture through the at least one drainage hole and into at least one of another planter container and a moisture receptacle.

6. The system of claim 1, further comprising a fastener configured to attach the container support to the vertical support.

7. The system of claim 6, wherein the fastener comprises at least one of a weld, a slit in the vertical support into which the container support can slide, and a keyhole system.

8. The system of claim 1, further comprising an irrigation system coupled to at least one of the planter container and the vertical support.

9. The system of claim 1, wherein the container support comprises a metal bar shaped to conform to a shape of at least one of the planter container's outer edges.

10. The system of claim 1, wherein a plurality of planter containers are disposed vertically with respect to each other.

11. The system of claim 1, wherein a plurality of planter containers are disposed adjacent with respect to each other in a continuous horizontal row.

12. The system of claim 11, wherein the adjacent planter containers are configured to follow a shape of the structure.

13. The system of claim 12, wherein two adjacent planter containers are configured at a 90° angle with respect to one another.

14. The system of claim 13, wherein the two of the adjacent planter containers are joined by a corner assembly.

15. The system of claim 14, wherein the corner assembly comprises an angled vertical support coupled to the structure and a corner support coupled to the two adjacent planter containers.

16. The system of claim 1, further comprising a mobile cart, and wherein the structure at least partially comprises a mobile cart.

17. The system of claim 1, wherein the vertical support further comprises a U-shaped end adapted to hang from the top of the structure.

18. The system of claim 1, wherein the front portion and the back portion of the planter container comprise a plurality of wood boards adapted to slide into the container support.

19. A vertical planter for mounting on a structure, comprising:
   a vertical support configured to be connected to the structure, wherein the vertical support comprises a plurality of attachment points arranged vertically with respect to each other;
   a planter container comprising:
      a front portion and a vertical back portion joining at a bottom portion of the front portion and the vertical back portion to form an inverse triangular cross-section with an apex at the bottom portion and an open top portion; and
      a pair of sidewall elements disposed at each end of the front portion and the back portion to define an interior volume of the planter container;
   a plurality of container supports affixed to the vertical support, wherein:
      a first container support extends perpendicularly outward from a first attachment point proximate to an upper edge of the vertical back portion, above and across the open top portion, to the front portion and downward along the front portion to a second attachment point proximate a lower edge of the vertical back portion;
      the first container support is configured to bear the weight of a first planter container; and
   wherein a plurality of planter containers and the plurality of container supports are arranged vertically with respect to one another along the vertical support.

20. The vertical planter of claim 19, further comprising a drainage system coupled to the planter container, wherein the drainage system comprises an opening in the bottom portion of the container and a water guide configured to direct moisture out of the planter container and into at least one of another lower positioned planter and a moisture receptacle.

21. The vertical planter of claim 20, wherein the vertical support further comprises a U-shaped end adapted to hang from a top of the structure.

22. The vertical planter of claim 20, wherein some of the plurality of containers are disposed adjacent with respect to each other in a continuous row.

23. The system of claim 22, wherein two adjacent planter containers are configured at a 90° angle with respect to one another on a corner of the structure.

24. The system of claim 23, wherein the two adjacent planter containers are joined by a corner assembly.

25. The system of claim 24, wherein the corner assembly comprises an angled vertical support coupled to the structure and a corner support coupled to the two adjacent planter containers.

26. The system of claim 19, further comprising a mobile cart, and wherein the structure at least partially comprises a mobile cart.

27. A planter system for mounting on a structure, comprising:
   a vertical support configured to be connected to the structure, wherein the vertical support comprises:
      a first attachment point; and
      a second attachment point positioned below the first attachment point;
   a planter container, comprising:
      a vertical back wall having an upper edge positioned proximate the first attachment point and a lower edge positioned proximate the second attachment point;
      a front wall extending upwardly away from the lower edge of the vertical back portion, wherein:
         a bottom of the front wall is positioned proximate the second attachment point; and
         a top of the front wall is positioned away from the vertical back wall at a height substantially equal to the upper edge of the vertical back wall; and
      a pair of sidewall elements disposed at each end of the front wall and the back wall, wherein the pair of sidewall elements, the front wall, and the back wall define an interior volume of the planter container having a triangular cross-section; and
   a container support affixed to the first and second attachment points, wherein the container support:
      extends perpendicularly outward from the first attachment point, above and across an open top portion of the container, to the top of the front wall; and
      extends downwardly along the front wall to the second attachment point.

* * * * *

UNITED STATES PATENT AND TRADEMARK OFFICE
CERTIFICATE OF CORRECTION

PATENT NO. : 9,986,694 B2
APPLICATION NO. : 13/920014
DATED : June 5, 2018
INVENTOR(S) : Billingsley Page 1 of 1

It is certified that error appears in the above-identified patent and that said Letters Patent is hereby corrected as shown below:

In the Claims

Column 11, Claim 17 Lines 9-10, please replace the top with a top.

Signed and Sealed this
Second Day of October, 2018

Andrei Iancu
*Director of the United States Patent and Trademark Office*